United States Patent
Somayajulu

(10) Patent No.: US 7,920,473 B1
(45) Date of Patent: Apr. 5, 2011

(54) METHOD AND SYSTEM FOR MANAGING TRANSMIT DESCRIPTORS IN A NETWORKING SYSTEM

(75) Inventor: David C. Somayajulu, Laguna Niguel, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1156 days.

(21) Appl. No.: 11/291,430

(22) Filed: Dec. 1, 2005

(51) Int. Cl.
*G06F 11/00* (2006.01)

(52) U.S. Cl. ........................................ 370/235; 370/462

(58) Field of Classification Search .................. 370/229, 370/230, 230.1, 235, 395.2, 395.21, 395.3, 370/462, 476; 709/223, 225, 226, 229, 250; 710/29, 36, 240–244

See application file for complete search history.

(56) References Cited

U.S. PATENT DOCUMENTS

| | | | |
|---|---|---|---|
| 5,051,982 A | 9/1991 | Brown et al. | |
| 5,881,313 A | 3/1999 | Ramakrishnan et al. | |
| 6,108,306 A | 8/2000 | Kalkunte et al. | |
| 6,438,630 B1 | 8/2002 | DeMoney | |
| 6,581,113 B1 | 6/2003 | Dwork | |
| 6,950,394 B1 | 9/2005 | Chou et al. | |
| 6,963,946 B1 * | 11/2005 | Dwork et al. | 710/310 |
| 7,095,760 B1 | 8/2006 | Parruck et al. | |
| 7,221,676 B2 | 5/2007 | Green et al. | |
| 7,301,898 B1 | 11/2007 | Martin et al. | |
| 7,395,306 B1 * | 7/2008 | Lai et al. | 708/700 |
| 7,426,210 B1 | 9/2008 | Miles et al. | |
| 7,496,699 B2 * | 2/2009 | Pope et al. | 710/52 |
| 7,596,086 B2 | 9/2009 | Wang et al. | |
| 2002/0198927 A1 | 12/2002 | Craddock et al. | |
| 2003/0137937 A1 | 7/2003 | Tsukishima et al. | |
| 2003/0225739 A1 * | 12/2003 | Chesson et al. | 707/1 |
| 2004/0019895 A1 | 1/2004 | Dubal | |
| 2004/0024904 A1 * | 2/2004 | DiMambro | 709/238 |
| 2004/0177164 A1 | 9/2004 | DiMambro et al. | |
| 2004/0223454 A1 | 11/2004 | Schober et al. | |
| 2004/0249933 A1 | 12/2004 | Govindarajan et al. | |
| 2005/0002389 A1 * | 1/2005 | Venkatanarayan et al. | 370/389 |
| 2005/0053060 A1 * | 3/2005 | Pettey | 370/385 |
| 2005/0060443 A1 | 3/2005 | Rosner | |
| 2005/0076166 A1 | 4/2005 | Shearer | |
| 2005/0174942 A1 | 8/2005 | Betker | |
| 2005/0198531 A1 * | 9/2005 | Kaniz et al. | 713/201 |

(Continued)

OTHER PUBLICATIONS

"Office Action from USPTO dated Aug. 20, 2009 for U.S. Appl. No. 11/874,752".
Pfister, Gregory F., "An Introduction to the InfiniBand Architecture", *IBM Enterprise server Group Server Technology and Architecture*, 617-632.

(Continued)

*Primary Examiner* — Donald L Mills

(74) *Attorney, Agent, or Firm* — Klein, O'Neill & Singh, LLP

(57) ABSTRACT

Method and system for managing transmit descriptors (TDs) for transmitting information over a network connection is provided. The method includes, allocating a minimum number of TDs to plural network connections at any given time; and determining an additional number of TDs for allocation to plural network connections, wherein the additional number of TDs is based on network traffic. The system includes a computing system with an operating system, a system memory and a network device driver; and a network adapter coupled to the computing system, wherein the operating system checks for availability of data for transmission over a plurality of network connections; and the network device driver allocates a minimum number of transmit descriptors (TDs) to the plural network connections at any given time; and determines an additional number of TDs for allocation to the plural network connections, wherein the additional number of TDs is based on network traffic.

22 Claims, 4 Drawing Sheets

U.S. PATENT DOCUMENTS

| | | |
|---|---|---|
| 2005/0254519 A1 | 11/2005 | Beukema et al. |
| 2006/0029097 A1* | 2/2006 | McGee et al. ............ 370/468 |
| 2008/0112314 A1 | 5/2008 | Rider |
| 2008/0198865 A1 | 8/2008 | Rudnick et al. |
| 2008/0209246 A1 | 8/2008 | Marks et al. |
| 2009/0116381 A1 | 5/2009 | Kanda |
| 2009/0154358 A1 | 6/2009 | Kanda et al. |

OTHER PUBLICATIONS

"Final Office Action from USPTO dated Mar. 2, 2010 for U.S. Appl. No. 11/874,752".

"Office Action from USPTO dated Nov. 26, 2010 for U.S. Appl. No. 11/874,752".

* cited by examiner

METHOD AND SYSTEM FOR MANAGING TRANSMIT DESCRIPTORS IN A NETWORKING SYSTEM

BACKGROUND

1. Field of the Invention

The present invention relates in general to networking, and more specifically, to management of transmit descriptors in networks.

2. Background of the Invention

Networks are commonly used today for exchange of information. Typically, in a network environment, data is transmitted and received via a network interface (may also be referred to as a network interface card or network adapter). The network interface adapter provides network connectivity to a computing system or device. A transport protocol (for example TCP/IP) is commonly used for providing reliable transfer of data between two nodes on a given network.

A node on a network is typically a computer (or any device), which can have several network interfaces to interface with plural types of networks. In order to transmit data on a network, the operating system (OS) of the computing system (or networked device) delivers data (or packet/frame) to a network interface device driver (may also be referred to as a driver). The driver interfaces the computing system with the network adapter. For each block of data that is to be transmitted, the driver maintains a software structure called a transmit descriptor. Typically, the transmit descriptors are allocated from a pre-allocated pool of buffers for performance.

When the network device driver is given data for transmission, it allocates a transmit descriptor from the pre-allocated pool and associates it with the data. The Transmit Descriptor is released back to the pool once data is transmitted on the wire.

Typical network traffic caters to both slow and fast connections. The transmit descriptors for slower connections take longer to process than faster connections, i.e. slower connection transmit descriptors get released later compared to faster connection related transmit descriptors. Hence, a slower connection can hold up transmit descriptors, which can cause faster connections to slow down due to lack of available transmit descriptors.

In another situation, consider a connection between an endpoint A and endpoint B. If endpoint B fails, it will take a finite amount of time for A to detect B's failure. During this time, the transmit descriptors allocated for endpoint A are held up.

Both the foregoing conditions can result in starvation for faster connections due to depletion of common resources (i.e. the transmit descriptors). Therefore, what is needed is a method and system for managing the transmit descriptors by dynamically allocating transmit descriptors based on traffic volume and connection speeds.

SUMMARY OF THE INVENTION

In one aspect of the present invention, a method for managing transmit descriptors (TDs) for transmitting information over a network connection is provided. The method includes, allocating a minimum number of TDs to plural network connections at any given time; and determining an additional number of TDs for allocation to plural network connections, wherein the additional number of TDs is based on network traffic.

In another aspect of the present invention, a networking system is provided. The system includes a computing system with an operating system, system memory and a network device driver; and a network adapter coupled to the computing system, wherein the operating system checks for availability of data for transmission over a plurality of network connections; and the network device driver allocates a minimum number of transmit descriptors (TDs) to the plural network connections at any given time; and determines an additional number of TDs for allocation to the plural network connections, wherein the additional number of TDs is based on network traffic.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general system/process for transmitting data in a hardware assisted networking system is described. The specific architecture and operation of the preferred embodiment will then be described with reference to the general description.

Figure 1A:
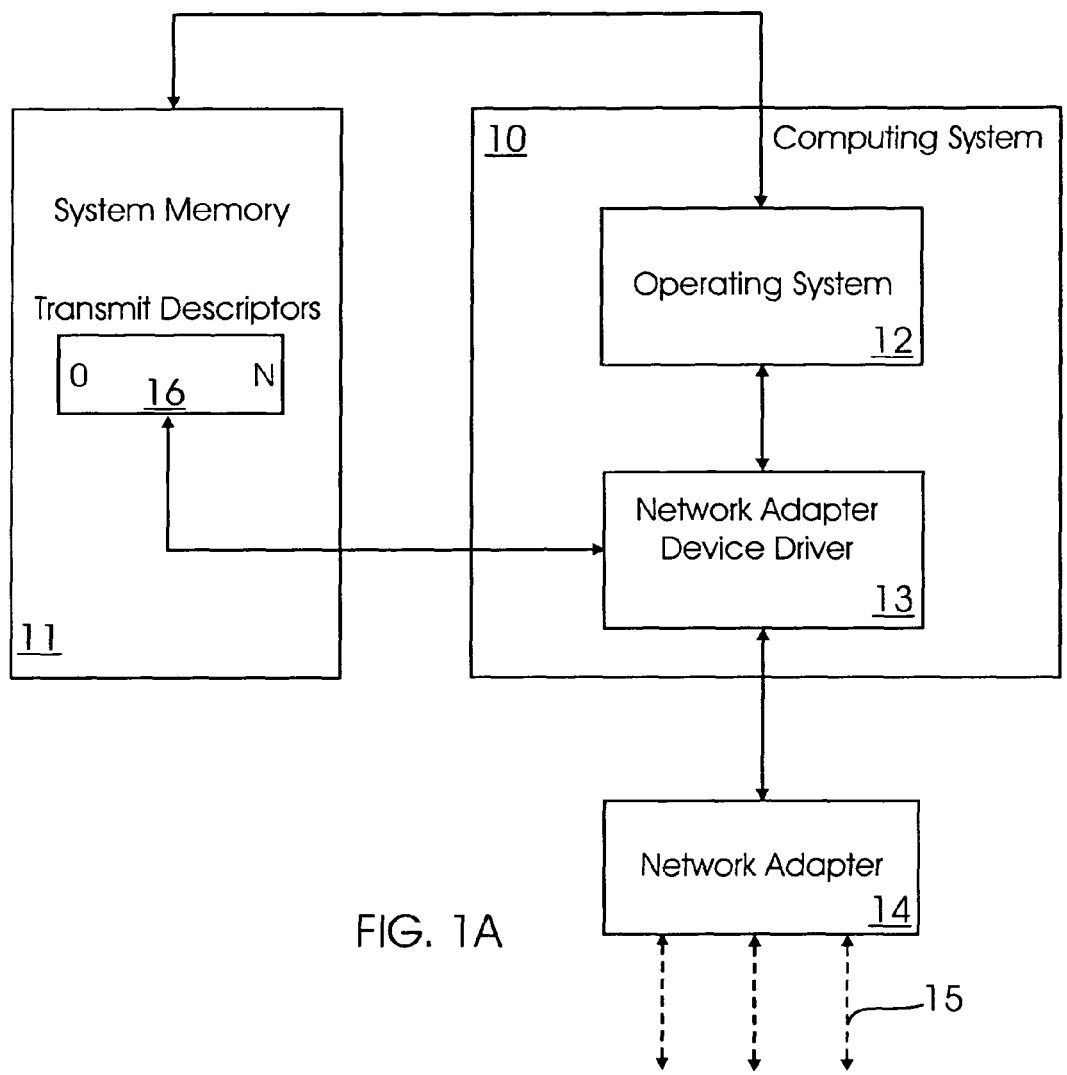
FIG. 1A shows a top-level system diagram of a networking system according to one aspect of the invention.

FIG. 1A shows a top-level system diagram of a networking system according to one aspect of the invention. The networking system includes a computing system (or device) 10 coupled to a network adapter 14. Network adapter 14 receives and sends information (i.e., data, commands, status information) via a network connection 15.

Computing system 10 typically includes several functional components. These components may include a central processing unit (CPU), main memory (or system memory 11), input/output ("I/O") devices, and storage media (for example, disk drives or any other media).

The main memory 11 is coupled to the CPU (not shown) via a system bus (not shown) or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed.

Computing system 10 operations are controlled by operating system 12 that interfaces with network adapter device driver 13 (may also be referred to as "device driver 13"). Device driver 13 maintains a software structure in system memory 11 for storing transmit descriptor information (shown as Transmit descriptors (0 to N) 16).

Operating system 12 checks for availability of data that needs to be sent out to the network via connection 15. This data is then delivered to device driver 13. When a transmit descriptor is available, it is assigned to a block of data and then data is transmitted via a network adapter 14.

It is noteworthy that there may be plural connections 15 to network adapter 14. Data is transmitted on the network via one of these connections.

Figure 1B:
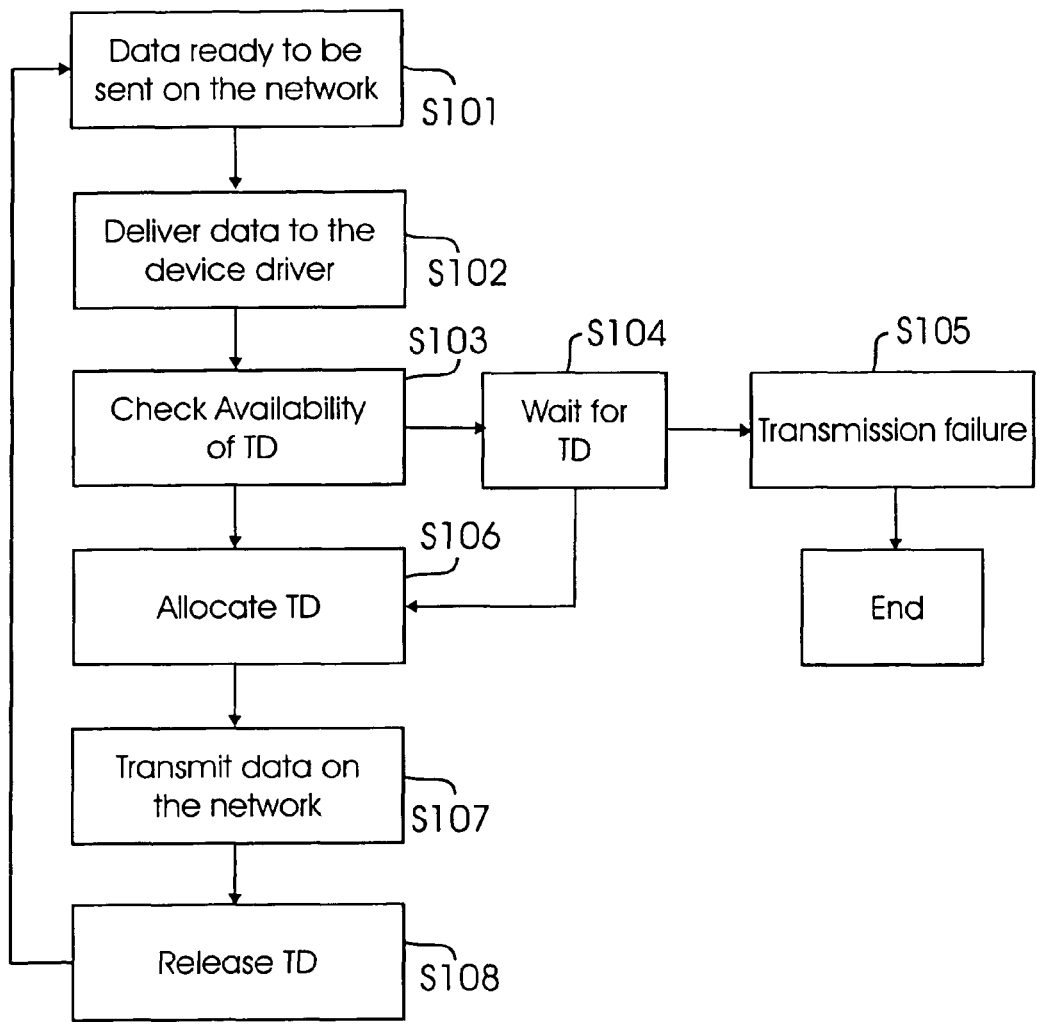
FIG. 1B shows a top-level flow diagram for transmitting data in a networking system.

FIG. 1B shows a top-level flow diagram for transmitting data in a networking system using the conventional technique of assigning transmit descriptors. In step S101, data is ready to be transmitted and in step S102, operating system 12 delivers the data to device driver 13. The process assumes that a valid network connection has been established.

In step S103, the device driver 13 checks for availability of transmit descriptors.

If a transmit descriptor is available, it is assigned to a block of data in step S106 and then in step S107, data is sent to the network via network adapter 14. The transmit descriptor is then released back to the pool in step S108.

If the transmit descriptor is not available in step S103, the driver then waits for the transmit descriptor to be available (step S104). If the wait exceeds a certain timeout value then a transmit failure results in step S105.

In a conventional networking system, transmit descriptors are pre-allocated from a global pool (16) to all connections. When data is transmitted on a connection that is slow, the transmit descriptor associated with the data is not released to the pool until the transmission is done. During this time period if there is data that needs to be transmitted on a faster connection, a transmit descriptor may not be readily available. This causes driver 13 to wait for a transmit descriptor as in step S104. As discussed above, this situation causes starvation for faster connections due to depletion of common resources, in this case, transmit descriptors.

According to one aspect of the present invention, transmit descriptors are allocated based on the connection speed and traffic volume. This eliminates the wait in step S104 and facilitates transmission of data without depleting available resources.

Figure 2:
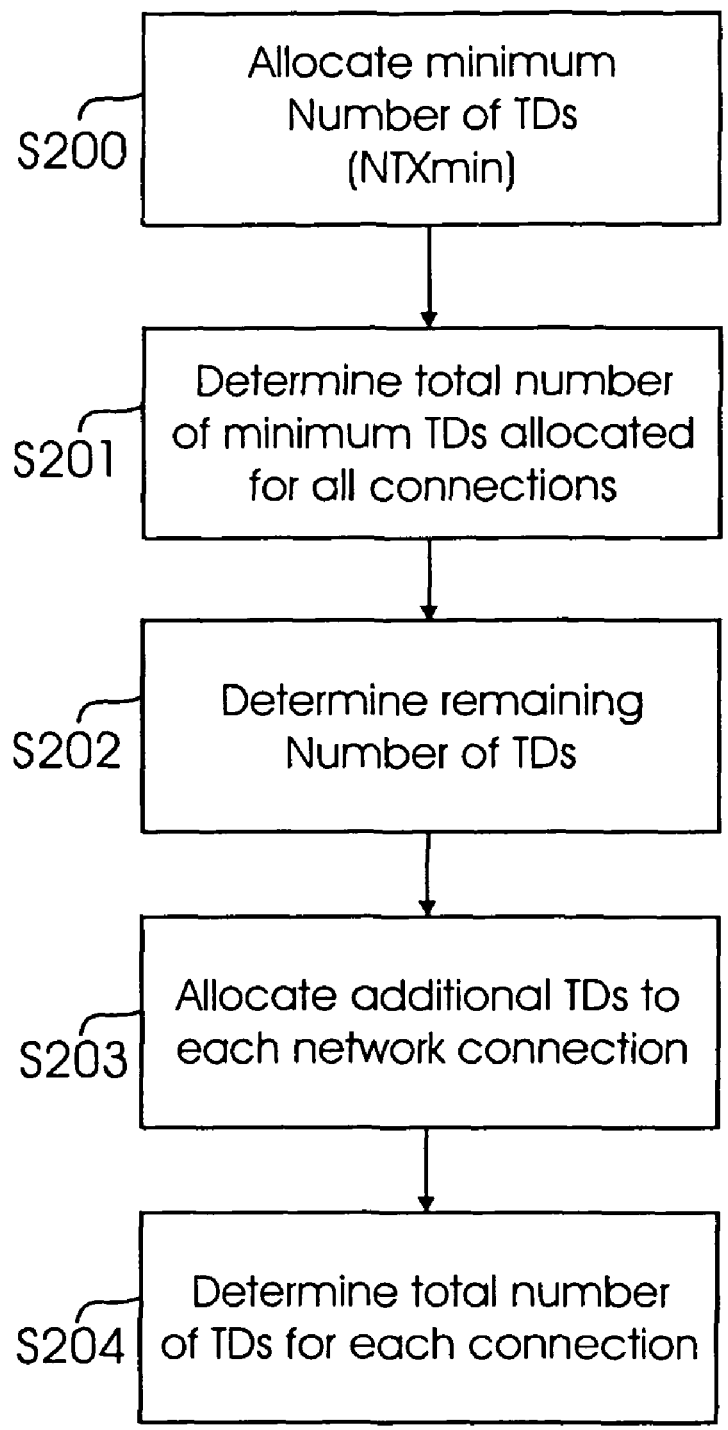
FIG. 2 is flow diagram for allocating transmit descriptors according to one aspect of the present invention.

FIG. 2 shows a process flow diagram for allocating transmit descriptors according to one aspect of the present invention.

In step S200, a minimum (or default) ("NTXmin") number of transmit descriptors are allocated (or reserved) for each network connection. Driver 13 performs this allocation. The default value may be based on historic network traffic volume for each connection. It is assumed that the device driver 13 is aware of the total number of network connections for a network node ("TC") at any given time.

In step S201, the process determines the total number of minimum transmit descriptors (TDs) used for all connections. In one aspect, driver 13 determines this number. The total number of connections is multiplied with NTXmin resulting in the total number of minimum transmit descriptors for all connections ("NTXmintotal"). The equation for step S202 can be expressed as NTXmintotal=TC*NTXmin, where TC is the total number of connections.

It is also assumed that the device driver 13 is aware of the total number of transmit descriptors ("NTXtotal"), that a network node can support.

In step S202, the process determines the total additional number (i.e. the remaining number of TDs) of transmit descriptors ("NTXatotal") that are available. The driver 13 performs this function. This can be obtained by subtracting NTXmintotal from NTXtotal shown mathematically as: NTXatotal=NTXtotal−NTXmintotal.

Figure 3:
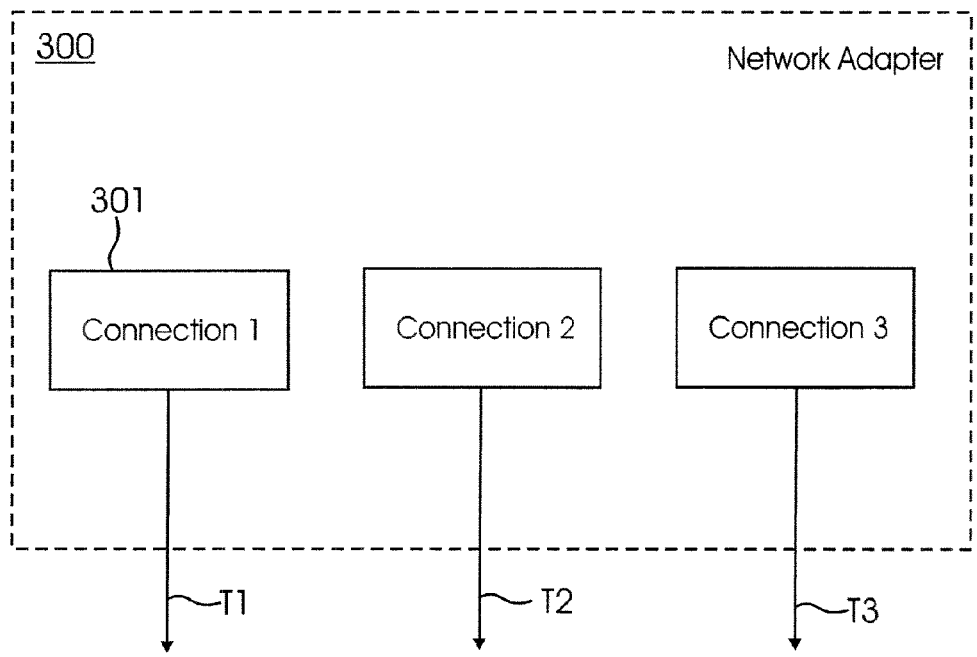
FIG. 3 shows an example of allocating transmit descriptors for a network node with 3 connections, according to one aspect of the present invention.

In step S203, additional transmit descriptors ("NTXa") for each connection are computed as follows: NTXa=constant*NTXatotal. This constant is based on various parameters, for example, connection speed, overall network traffic and others. FIG. 3 shows an example of how the additional TDs for each connection are allocated, as described below.

In step S204, the total number of transmit descriptors for each connection is determined. This is based on the sum of NTXmin and NTXa (NTX=NTXmin+NTXa).

FIG. 3 provides an example for calculating the additional transmit descriptors for each connection of a node with 3 connections. When a network adapter (14) with 3 connections has 3 different transmit speeds T1, T2, and T3, then the additional transmit descriptors for each connection is calculated as following:

$$NTXa1 = constant1 * NTXatotal;$$

$$NTXa2 = constant2 * NTXatotal; \text{ and}$$

$$NTXa3 = constant3 * NTXatotal.$$

The constant for each connection is based on the transmit speeds. The constant value is directly proportional to the transmit speed and may be calculated using the following formula:

$$constant1 = T1/(T1+T2+T3);$$

$$constant2 = T2/(T1+T2+T3); \text{ and}$$

$$constant3 = T3/(T1+T2+T3).$$

Based on the foregoing, faster connections are allocated more transmit descriptors than slower connections. Therefore, when data becomes available to be transmitted on a faster connection, the probability of assigning a transmit descriptor to the data is higher. This eliminates the need to wait for a transmit descriptor and therefore aids the transmission of data without being starved.

Although the present invention has been described with reference to specific embodiments, these embodiments are illustrative only and not limiting. Many other applications and embodiments of the present invention will be apparent in light of this disclosure and the following claims.

What is claimed is:

1. A method implemented on a computing system for managing transmit descriptors (TDs) for transmitting information over a network connection, comprising:

allocating a minimum number of TDs to a plurality of network connections, wherein the minimum number of TDs for each network connection is based on historic network traffic volume for that connection; and determining an additional number of TDs to be allocated to each network connection, wherein the additional number of TDs allocated to each network connection is based on network traffic volume for that connection.

2. The method of claim 1, wherein a total number of TDs is constant for a given network node and the network node can process information using the plural network connections.

3. The method of claim 1, wherein the TDs are maintained in a system memory of a computing system coupled to a network adapter.

4. The method of claim 1, wherein computing the additional number of transmit descriptors (NTXa) for each of the plural network connections comprises calculating a total number of additional TDs (NTXatotal), and multiplying NTXatotal with a plurality of constant values associated with each of the plural network connections.

5. The method of claim 4, wherein NTXatotal is the difference between a total number of TDs and the sum of all of the minimum numbers of TDs allocated to each of the plural connections.

6. A networking system, comprising:
a computing system with an operating system, a system memory and a network device driver; and
a network adapter coupled to the computing system, wherein the operating system is configured to check for availability of data for transmission over a plurality of network connections, and the network device driver is configured to allocate a minimum number of transmit descriptors (TDs) to the plural network connections, the minimum number of TDs for each network connection being based on historic network traffic volume for that connection and the network device driver is further configured to determine an additional number of TDs to be allocated to each network connection, the additional number of TDs allocated to each network connection being based on network traffic volume for that connection.

7. The system of claim 6, wherein a total number of TDs is constant for a given network node and the network node can process information using the plural network connections.

8. The system of claim 6, wherein the TDs are maintained in the system memory.

9. The system of claim 6, wherein the additional number of TDs (NTXa) for each of the plural network connections is determined by calculating a total number of additional TDs (NTXatotal), and multiplying NTXatotal with a plurality of constant values associated with each of the plural network connections.

10. The system of claim 9, wherein NTXatotal is the difference between a total number of TDs and the sum of all of the minimum numbers of TDs allocated to each of the plural connections.

11. A computer-implemented method for managing transmit descriptors (TDs) for transmitting information over a network connection, comprising:
allocating a minimum number of TDs to a plurality of network connections, wherein the minimum number of TDs for each network connection is based on historic network traffic volume for that connection; and
determining an additional number of TDs to be allocated to each network connections, wherein the additional number of TDs allocated to each network connection is based on a transmit speed of that connection.

12. The method of claim 11, wherein a total number of TDs is constant for a given network node and the network node can process information using the plural network connections.

13. The method of claim 11, wherein the TDs are maintained in a system memory of a computing system coupled to a network adapter.

14. The method of claim 11, wherein computing the additional number of transmit descriptors (NTXa) for each of the plural network connections comprises calculating a total number of additional TDs (NTXatotal), NTXatotal with a plurality of constant values associated with each of the plural network connections.

15. The method of claim 14, wherein NTXatotal is the difference between a total number of TDs and the sum of all of the minimum numbers of TDs allocated to each of the plural connections.

16. The method of claim 14, wherein the constant value for each connection is calculated by dividing the transmit speed of that connection by the sum of the transmit speeds for all connections.

17. A networking system, comprising:
a computing system with an operating system, a system memory and a network device driver; and
a network adapter coupled to the computing system, wherein the operating system is configured to check for availability of data for transmission over a plurality of network connections, and the network device driver is configured to allocate a minimum number of transmit descriptors (TDs) to the plural network connections, the minimum number of TDs for each network connection being based on historic network traffic volume for that connection and the network device driver is further configured to determine an additional number of TDs to be allocated to each network connection, the additional number of TDs allocated to each network connection being based on a transmit speed of that connection.

18. The system of claim 17, wherein a total number of TDs is constant for a given network node and the network node can process information using the plural network connections.

19. The system of claim 17, wherein the TDs are maintained in the system memory.

20. The system of claim 17, wherein the additional number of TDs (NTXa) for each of the plural network connections is determined by calculating a total number of additional TDs (NTXatotal), and multiplying NTXatotal with a plurality of constant values associated with each of the plural network connections.

21. The system of claim 20, wherein NTXatotal is the difference between a total number of TDs and the sum of all of the minimum numbers of TDs allocated to each of the plural connections.

22. The system of claim 20, wherein the constant value for each connection is calculated by dividing the transmit speed of that connection by the sum of the transmit speeds for all connections.

* * * * *